United States Patent [19]

Lupkas

[11] 4,116,224
[45] Sep. 26, 1978

[54] SOLAR ENERGY COLLECTION DEVICE

[76] Inventor: Raymond R. Lupkas, 54 Mt. Pleasant Dr., Trumbull, Conn. 06611

[21] Appl. No.: 761,422

[22] Filed: Jan. 21, 1977

[51] Int. Cl.² ............................................. F24J 3/02
[52] U.S. Cl. ................................... 126/271; 126/270; 237/1 A
[58] Field of Search ............... 126/270, 271; 237/1 A

[56] References Cited

U.S. PATENT DOCUMENTS

| 3,866,285 | 2/1975 | Clark | 126/271 |
|---|---|---|---|
| 3,982,527 | 9/1976 | Cheng et al. | 126/271 |
| 4,007,728 | 2/1977 | Guba | 126/271 |
| 4,007,729 | 2/1977 | Chao et al. | 126/271 |
| 4,011,855 | 3/1977 | Eshelman | 126/271 |
| 4,038,965 | 8/1977 | Lyon | 126/271 |

*Primary Examiner*—Henry C. Yuen
*Attorney, Agent, or Firm*—Robert E. Meyer

[57] ABSTRACT

A solar heat energy collector device is disclosed wherein the sun's rays strike a collector located in an insulated enclosure. The heat energy from the sun is transferred to this collector. Also forming part of the collector are conduits which contain a fluid which absorbs the heat from the collector. The heated fluid is circulated outside of the device to a remote point for utilization in any desired manner. The collector is constructed so as to be able to absorb not only the sun's rays which directly strike it but also to absorb a portion of the rays which are reflected from the collector after directly striking it. This is accomplished by providing a collector formed in the shape of a plurality of adjoining tubes each having a longitudinally extending opening therein to permit the sun's rays to strike the interior of the tubes and be captured therein in addition to striking the exterior of the tubes.

8 Claims, 6 Drawing Figures

SOLAR ENERGY COLLECTION DEVICE

BACKGROUND

This invention relates to a device for collecting solar rays and transferring the heat energy contained therein to a fluid which may be circulated to any type of utilization device.

In recent years much attention has been given to alternate sources of energy as a result of increases in the cost of fossil fuels and the limited reserves of such fuels. Among the alternate sources of energy being considered, solar energy has captured the imagination of many people because of its ready availibility and absence of direct costs. Solar energy can be harnessed in a number of ways; silicon cells for instance, can be used to transfer the energy from the sun directly into electricity. Another approach, where heat energy is desired, is simply to place some type of collecting device in direct exposure to the sun's rays. Many types of heat collector devices have been proposed and built. They range from a simple metalic plate over which air is circulated to a pair of plates with a small gap therebetween in which a liquid, usually water, may be circulated to extract the heat from the plates. Many variations of this latter method have been tried to improve the efficiency of these units including the use of corrugated plates, coiled tubing, baffles, etc. There is one feature common to all these types of collectors. That is the portion of the plate directly exposed to the sun's rays is coated with a heat absorbing material such as flat black paint. This coating increases the absorbtion ability of the plate by substantially reducing the amount of the sun's rays reflected from the plate. Even with this coating however, only about 80% of the sun's rays will be absorbed by the collector while the remaining 20% is reflected and lost.

Each of the many types of collectors proposed have worked with varying amounts of efficiency and the search continues to find the most efficient and inexpensive collector device.

SUMMARY OF THE INVENTION

The present invention is an improved solar heat energy collector which is constructed so as to give the collector unit the ability to absorb more heat from the sun's rays by capturing a portion of the sun's rays which are normally reflected after initially striking the collector. The invention provides for a collector which has a plurality of longitudinally extending adjoining tubes in heat exchange relationship with one another. Each of these tubes has a longitudinally extending opening therein to permit the sun's rays to directly strike the interior of the tube. To permit greater heat absorbition the interior and exterior surfaces of the tubes are coated with a heat absorbing material such as black paint. At least one fluid carrying conduit is provided which is located in heat exchange relationship with two of the tubes. When the collector is exposed to the sun's rays, a portion of the rays will strike the exterior surface of the tubes and heat will be absorbed by the tubes. The remaining portion of the rays will pass through the openings in the tubes and strike the interior surface thereof and heat from these rays will also be transferred to the tubes. However, about 20% of the energy in the rays will be reflected back from these interior surfaces. Because of the tubular construction of the collectors, these reflected rays will also strike the interior of the tubes and in this way the rays which are exposed to the interior of the tubes are completely captured therein thus permitting substantially all of the available heat energy in these rays to be transferred to the tubes. The heat absorbed by the tubes is further transferred by conduction through the tubes to the fluid in the conduits for circulation to a remote point for utilization.

The collector may be mounted in the interior of an insulated enclosure having a bottom wall, two upstanding side walls and two upstanding end walls. A solar energy transparent plate is mounted on the top of the enclosure which allows solar energy to pass therethrough and strike the collector. The enclosure may be made large enough to accommodate a number of individual collectors therein and in this instance, means are provided to connect the liquid carrying conduits of each of the collectors in parallel to provide a plurality of liquid carrying paths through the enclosure.

To concentrate the solar energy in the collector, a linear lens is mounted above and in line with the collector. The distance from the lens to a common plane passing through the center of the adjoining tubes is equal to the focal length of the lens and the sun's rays passing through the lens will be concentrated in the interior of each tube as the sun rises and sets.

Another feature of the invention is the manufacture of the tubes and conduits in a unitary fashion such as through the use of an extrusion process.

Accordingly, it is an object of this invention to provide a solar energy collector which is more efficient in its collection of solar energy than prior art devices.

Another object is to provide a collector which will capture not only the direct rays of the sun which strike it but will also capture a portion of the rays which are reflected from the collector.

Another object is to provide a collector which is simple to manufacture and low in cost.

DETAILED DESCRIPTION

Figure 1:
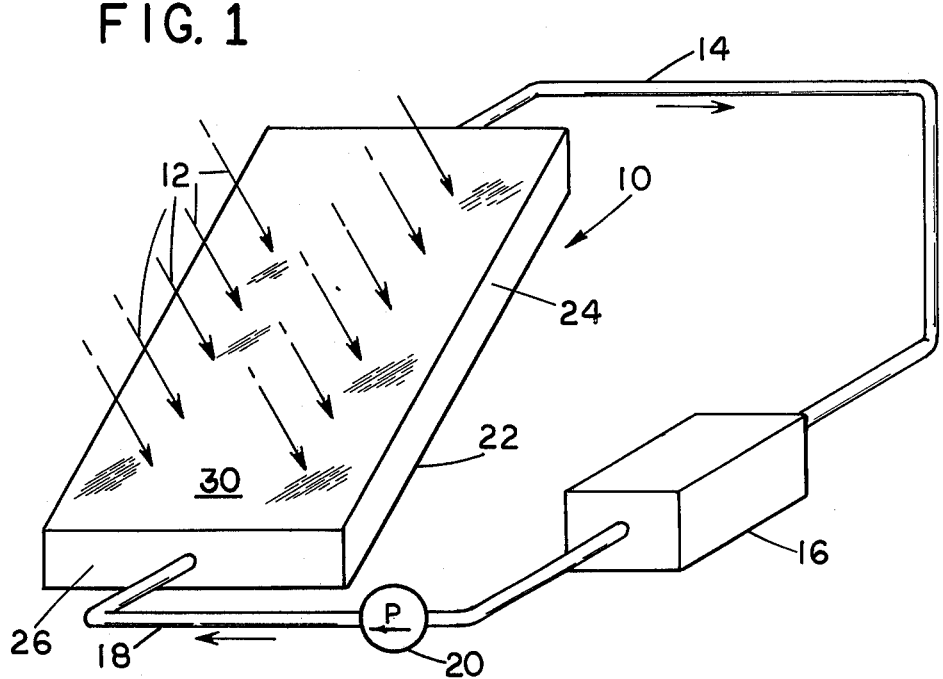
FIG. 1 schematically illustrates the solar energy collector device of this invention.

Referring to FIG. 1, a solar energy collector device 10 is oriented so as to be exposed to the sun's rays 12. Located within the device 10 is a collector unit which will be later described in detail. The rays from the sun heat the collector and the heat is transferred to a fuild such as water circulating through conduits associated with the collector unit. The water thus heated, exits the top of the collector device and flows through pipe 14 to a heat utilization device 16 wherein the heat energy may be utilized in any desired manner which is not part of the present invention. Cooler water then flows from the utilization device 16 through pipe 18 back to the collector device 10 to be reheated. A pump 20 is used to circulate the water through the system. The embodiment shown does not preclude the use of a gravity system by placing the collector lower than the utilization device 16.

Figure 2:
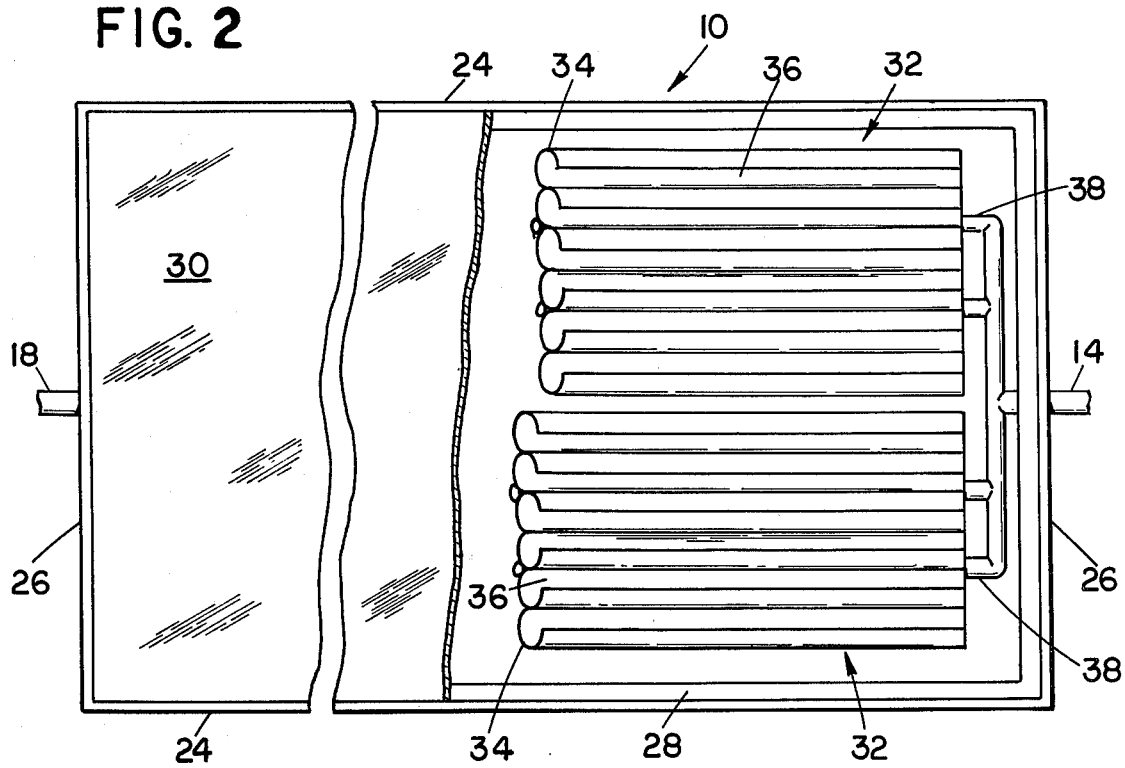
FIG. 2 is a detailed top view of the solar energy collector device with the top plate broken away showing two individual collectors located therein.
Figure 3:
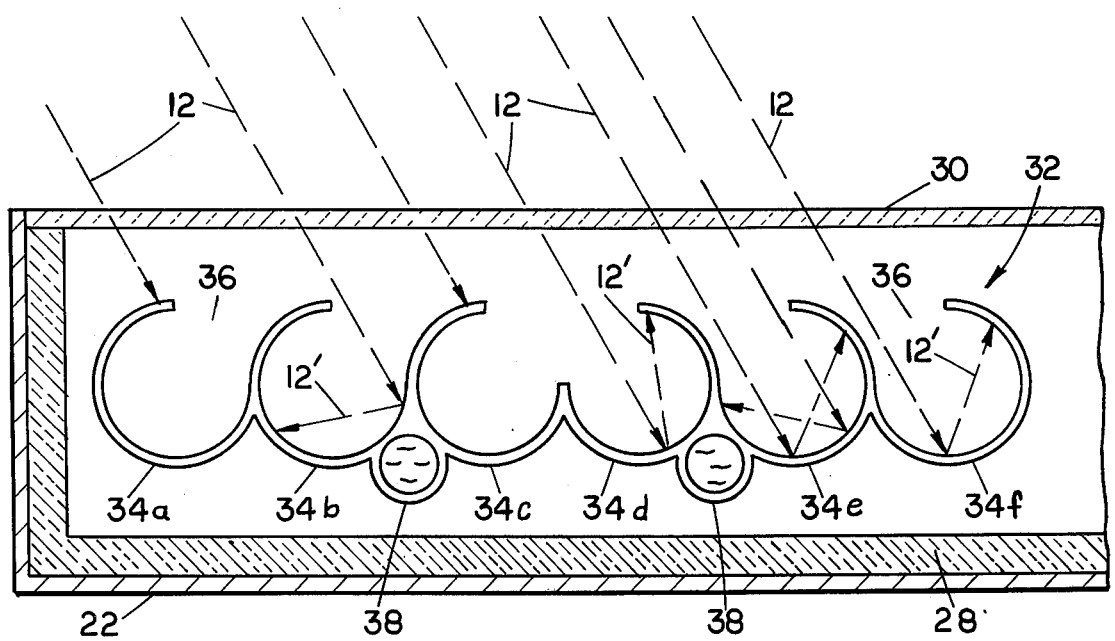
FIG. 3 is a greatly enlarged partial cross-sectional view of the device of FIG. 2 showing one of the collectors located therein and the manner in which the sun's rays strike the collector.
Figure 4:
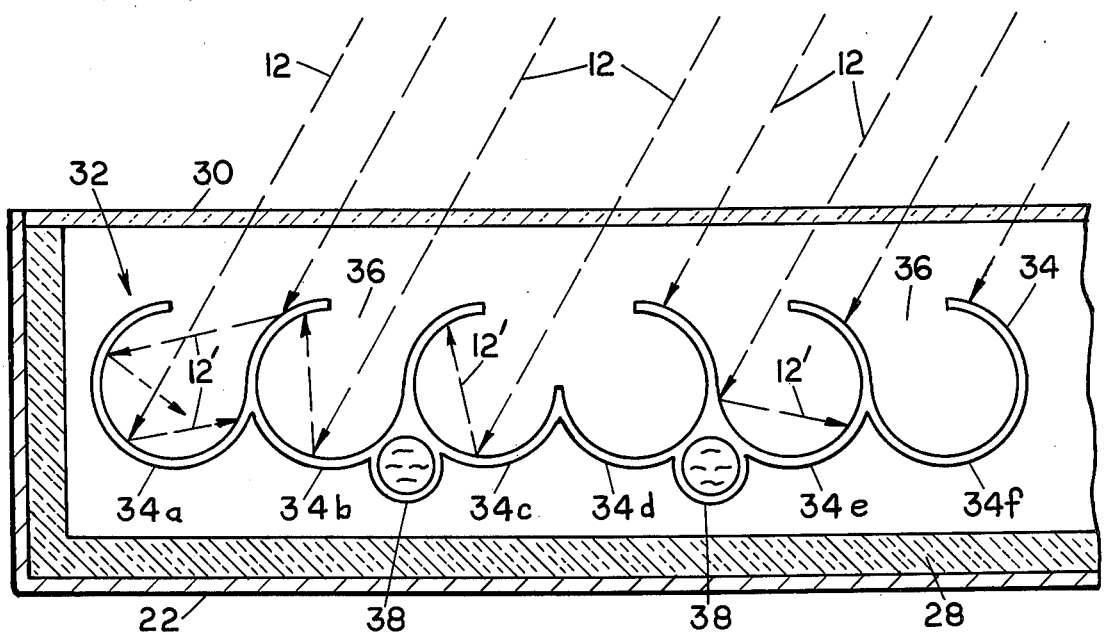
FIG. 4 is a similar view to that of FIG. 3 showing the sun's rays striking the collector from a different angle.

As seen in FIG. 2, the device 10 comprises a substantially rectangular enclosure having a bottom wall 22, two upstanding side walls 24 and two upstanding end walls 26. The inner surface of these walls are lined with any suitable heat insulating material 28. A plate 30, preferably glass, is mounted on the top of the enclosure. As shown in FIG. 2, there are two solar energy collectors 32 mounted side by side within the enclosure in any suitable manner. The number of individual collectors 32 used within an enclosure is determined only by the size of the enclosure and the individual collectors. When a larger quantity of heat output is desired, a larger number of individual collectors 32 could be placed in a larger enclosure. In one embodiment, the collector 32 consists of six longitudinally extending adjoining tubes 34. (For specific reference, these tubes are designated 34a through 34f when viewed from left to right in FIG. 3). The centers of the tubes 34 are located in a common plane with adjoining tubes being in heat exchange relationship with one another. Each of the tubes 34 have a longitudinally extending opening 36 therein. The openings 36 subscribe an arc of approximately 90° in the periphery of each tube 34 and are oriented in the first quadrant for the first three tubes (34a, 34b, 34c) in the common plane and are oriented in the second quadrant for the remaining three tubes (34d, 34e, 34f) in the common plane. These openings are oriented in this manner because the angle of the sun's rays to the collector is constantly changing during the day and this orientation of the openings 36 allows a substantial portion of the sun's rays to enter the interior of at least three of the tubes at all times. For example, in the morning, the sun's rays will strike the collector as shown in FIG. 3 and a greater portion of the sun's rays will strike the interior of tubes 34d, 34e and 34f than will strike the interior of tubes 34a, 34b and 34c. In the afternoon, as shown in FIG. 4, the situation is exactly the opposite. To increase the heat absorbtion ability of the tubes 34, the interior and exterior surfaces thereof are coated with a heat absorbing material such as a flat black paint.

Mounted between tubes 34b and 34c and between tubes 34d and 34e are fluid carrying conduits 38. These two conduits are joined at each end of the collector 32 and connected to the pipes 14 and 18 to provide a path for a fluid to circulate through the system.

The collector 32 as shown in the drawings is formed so as to be easily and inexpensively manufactured using an extrusion process. However, other methods of manufacture could be used. For example, several lengths of standard rigid tubing could be placed side by side and joined together by welding or soldering to form the tubes 34 and conduits 38. The openings 36 in each of the tubes could be cut out before or after the soldering operation.

Referring to FIGS. 3 and 4, it can be seen that as the sun's rays 12 strike the collector device 10, they pass through the glass cover plate 30 and strike directly on the collector 32. Some of the rays 12 strike the exterior surface of the tubes 34 while other of the rays 12 pass through the openings 36 in the tubes and strike the interior surface of the tubes. Even though both the interior and exterior surfaces of the tubes are coated with a heat absorbing material, approximately 20% of the heat energy in the rays 12 will be reflected back from these surfaces. However, the rays 12 which strike the interior surfaces will be reflected (shown as 12′) toward another portion of the interior of the tubes and are in effect captured therein. This capturing of these reflected rays 12′ allows the tubes 34 to absorb a greater measure of the available heat energy in the rays thereby increasing the efficiency of the collector.

Therefore, the tubes 34 absorb heat from the sun's rays 12 which: 1) strike directly on the exterior surface of the tubes; 2) from the rays 12 which strike directly on the interior of the tubes and; 3) from the reflected rays 12′ which also strike the interior of the tubes. The heat thus absorbed is transferred by conduction to the water circulating in the conduits which are in heat exchange relationship with the tubes. The heated water is circulated by pump 20 through the pipe 14 to a utilization device 16 and back through pipe 18 to be reheated by the collector 32.

Figure 6:
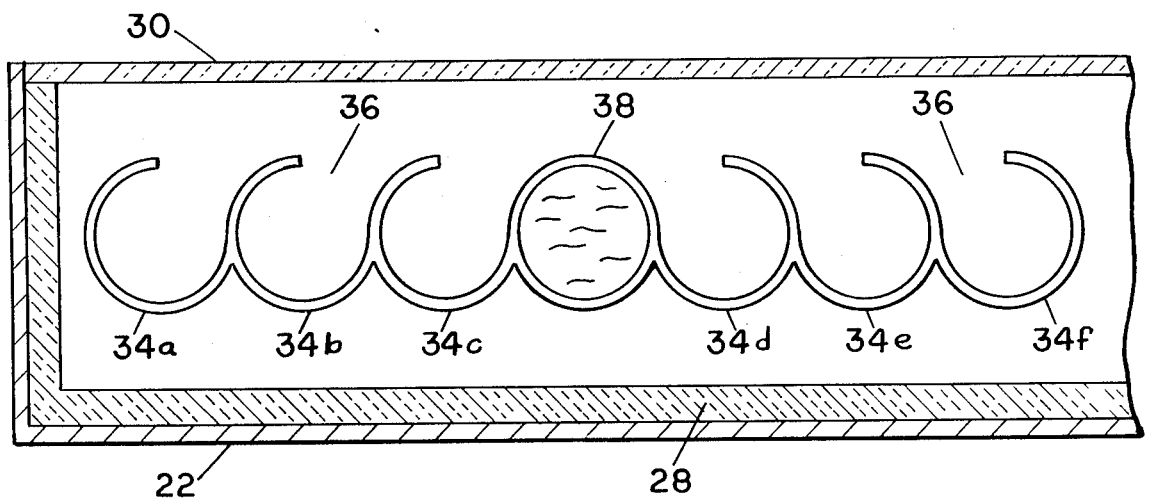
FIG. 6 is a greatly enlarged partial cross-sectional view of the solar energy collector device showing another embodiment of the collector of the invention.

Another embodiment of the collector 32 is shown in FIG. 6. In this embodiment, the collector 32 again comprises six longitudinally extending tubes 34. (These individual tubes are also designated 34a through 34f). The centers of the tubes 34 are located on a common plane with adjoining tubes 34a, 34b and 34c and adjoining tubes 34d, 34e and 34f being in heat exchange relationship with one another. Each of the tubes 34 has a longitudinally extending opening 36 therein. Mounted between tubes 34c and 34d with its axis on the common plane of tubes 34 is a fluid carrying conduit 38 in heat exchange relationship with tubes 34c and 34d. It can be seen that the operation of this embodiment of the collector 32 is identical to that described for the first embodiment. It is anticipated that this second embodiment will lend itself more readily to fabrication using an extrusion process.

Figure 5:
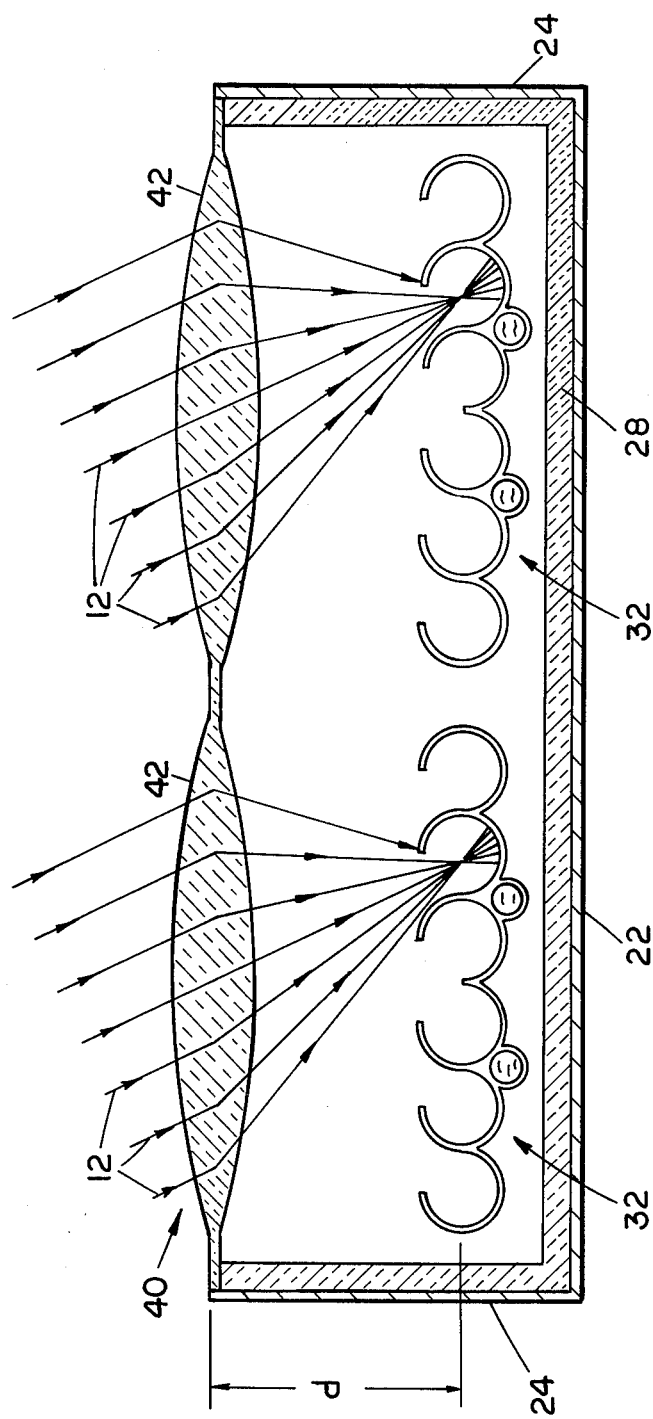
FIG. 5 is an enlarged cross-sectional view of a collector device of the type shown in FIG. 2 wherein lenses are used to concentrate the sun's rays on the collectors.

To further improve the efficiency of the collector device 10, a linear lens 40 may be be substituted for the glass plate 30 mounted on top of the enclosure. As shown in FIG. 5, one lens element 42 is positioned above and in line with each collector 32 used in the enclosure. The distance $d$ from the centerline of the lens to the common plane through the center of the tubes 34 of the collector 32 is equal to the focal length of the lens. Therefore, as the sun's rays strike the lens, they are focused along the centerline or common plane of the collector 32. As the sun rises, its rays will be focused by each lens element 42 into the interior of tube 34f. As the angle of the sun's rays to the lens changes during the day, the point of concentration of the rays will travel successively into tubes 34e, 34d, etc. and back until the rays are focused once again into tube 34f as the sun sets. The concentration of the rays 12 into the interior of the tubes 34 in this manner permits more rays to be reflected and captured within the interior of the tubes 34 thus providing greater opportunity for the heat contained in the rays to be absorbed by the collector 32 and transferred to the fluid in the conduit 36 for utilization.

Having described and illustrated the present invention, it will be apparent to those skilled in the art that variations may be made thereto without departing from the spirit of the invention and the scope of the appended claims.

What is claimed is:

1. A collector for capturing solar rays and transferring the heat energy therein to a circulating fluid for utilization comprising:
   A. a plurality of longitudinally extending adjoining tubes in heat exchange relationship with one another, each of said tubes having a longitudinally extending opening therein which subscribes an arc of approximately 90° and said openings are oriented in the first quadrant for half of the adjoining tubes and in the second quadrant for the other half of the adjoining tubes to permit a first portion of the interior of said tubes to be directly exposed to solar rays, said tubes having a second interior portion to be exposed to solar rays reflected from said first portion, the interior and exterior surfaces of said tubes having a heat absorbing coating thereon, and
   B. at least one fluid carrying conduit located in heat exchange relationship with two of said tubes,
   whereby when the collector is exposed to solar rays, a portion of the rays will strike the exterior surfaces of the tubes and a portion of the rays will pass through the openings in the tubes to directly strike the interior of the tubes where any reflected rays will strike another portion of the interior of the tubes to permit the tubes to absorb a greater measure of the available heat energy from the rays and said absorbed heat energy is transferred by conduction through the tubes to the fluid in the conduit for utilization.

2. The collector of claim 1 wherein there are six tubes and two fluid carrying conduits located on the opposite side thereof from said longitudinally extending openings.

3. The collector of claim 1 wherein there are six tubes and one fluid carrying conduit, the axis of said tubes and said conduit being generally aligned on a common plane with three of said tubes being located on each side of said conduit.

4. The collector of claim 1 wherein the entire assembly of tubes and conduits is constructed in a unitary fashion using an extrusion process.

5. The collector of claim 1 further comprising:
   A. an enclosure having a bottom wall, two upstanding side walls and two upstanding end walls;
   B. a heat insulating material covering the inner surfaces of said enclosure;
   C. a solar energy transparent plate mounted on the top of said enclosure; wherein said collector is mounted in the interior of said enclosure.

6. The device of claim 5 wherein the solar energy collector comprises six tubes and there are two fluid carrying conduits located on the opposite side thereof from said longitudinally extending openings.

7. The device of claim 5 wherein the solar energy collector comprises six tubes and one fluid carrying conduit, the axis of said tubes and said conduit being generally aligned on a common plane with three of said tubes being located on each side of said conduit.

8. A device for collecting solar energy comprising:
   A. an enclosure having a bottom wall, two upstanding side walls and two upstanding end walls,
   B. a heat insulating material covering the inner surfaces of said enclosure;
   C. a solar energy transparent cmounted on the top of said enclosure;
   D. a plurality of solar energy collectors mounted in the interior of said enclosure each of said plurality of collectors comprising,
      six longitudinally extending adjoining tubes, the centers of said tubes being generally aligned on a common plane with adjoining tubes being in heat exchange relationship with one another, each of said tubes having a longitudinally extending opening therein which subscribes an arc of approximately 90° and said openings are oriented in the first quadrant for half of the adjoining tubes and in the second quadrant for the other half of the adjoining tubes to permit a first portion of the interior of said tubes to be directly exposed to solar rays, said tubes having a second interior portion to be exposed to solar rays reflected from said first portion, the interior and exterior surfaces of said tubes having a heat absorbing coating thereon, and one liquid carrying conduit located in heat exchange relationship with two of said tubes; and
   E. means connecting said liquid carrying conduit of each of said plurality of collectors in parallel for providing a plurality of liquid carrying paths through said enclosure; whereby when the device is exposed to solar rays, the rays will pass through the transparent plate into the enclosure and a portion of the rays will strike the exterior surfaces of the tubes and a portion of the rays will pass through the openings in the tubes to directly strike the interior of the tubes where any reflected rays will again strike the interior of the tubes to permit the tubes to absorb a greater measure of the available heat energy from the rays and said absorbed heat energy is transferred by conduction through the tubes to the fluid in the conduit for utilization.

* * * * *

UNITED STATES PATENT AND TRADEMARK OFFICE
CERTIFICATE OF CORRECTION

PATENT NO. : 4,116,224
DATED : September 26, 1978
INVENTOR(S) : Raymond R. Lupkas It is certified that error appears in the above-identified patent and that said Letters Patent are hereby corrected as shown below:

Claim 8, line 6; after "transparent" insert --plate-- delete "cmounted".

Signed and Sealed this

Twentieth Day of March 1979

[SEAL]

Attest:

RUTH C. MASON
Attesting Officer

DONALD W. BANNER
Commissioner of Patents and Trademarks